United States Patent [19]

Overmyer

[11] Patent Number: 4,557,510
[45] Date of Patent: Dec. 10, 1985

[54] CORRUGATED TUBE COUPLING
[75] Inventor: Stephen R. Overmyer, Francesville, Ind.
[73] Assignee: Francesville Drain Tile Corporation, Francesville, Ind.
[21] Appl. No.: 492,798
[22] Filed: May 9, 1983
[51] Int. Cl.4 .............................................. F16L 37/14
[52] U.S. Cl. ..................................... 285/305; 285/419; 285/423; 285/DIG. 4; 138/158; 138/173; 428/178; 428/179
[58] Field of Search ................. 285/419, 423, DIG. 4, 285/373, 305, 293, DIG. 22; 24/16 PB, 17 AP, 305 P, 20 EE, 20; 138/158, 159, 172–173; 428/178, 179, 180

[56] References Cited
U.S. PATENT DOCUMENTS

| 955,847 | 4/1910 | Carmean . | |
|---|---|---|---|
| 997,994 | 7/1911 | Hahn | 428/179 |
| 1,747,500 | 2/1930 | Butler . | |
| 1,902,872 | 3/1933 | Long | 428/179 |
| 2,338,749 | 1/1944 | Wilbur | 428/179 |
| 2,540,141 | 2/1951 | Shafer | 138/158 |
| 2,718,117 | 9/1955 | Boyle et al. | 138/158 |
| 2,985,915 | 5/1961 | Winstead | 264/292 |
| 3,484,835 | 12/1969 | Trounstine | 428/179 |
| 3,566,607 | 3/1971 | Sixt | 61/11 |
| 3,699,684 | 10/1972 | Sixt | 61/11 |
| 3,785,682 | 1/1974 | Schaller et al. | 285/24 |
| 3,825,288 | 7/1974 | Maroschak | 285/156 |
| 3,897,090 | 7/1975 | Maroschak | 285/DIG. 22 |
| 3,958,425 | 5/1976 | Maroschak | 61/11 |
| 4,003,122 | 1/1977 | Overmyer et al. | 29/429 |
| 4,006,599 | 2/1977 | Hegler et al. | 61/11 |
| 4,026,586 | 5/1977 | Kennedy, Jr. et al. | 285/373 |
| 4,061,368 | 12/1977 | Auriemma | 285/383 |
| 4,084,844 | 4/1978 | Abner | 285/373 |
| 4,129,926 | 12/1978 | Henning | 24/22 |
| 4,135,634 | 1/1979 | Frye | 220/5 |
| 4,140,422 | 2/1979 | Crumpler et al. | 405/49 |
| 4,168,091 | 9/1979 | Boomgarden et al. | 285/419 |
| 4,171,834 | 10/1979 | Abner | 285/373 |
| 4,174,985 | 11/1979 | Buidry | 156/244 |
| 4,182,580 | 1/1980 | Hieda et al. | 405/43 |
| 4,182,581 | 1/1980 | Uehara et al. | 405/43 |
| 4,222,594 | 9/1980 | Skinner | 285/DIG. 4 |
| 4,273,367 | 6/1981 | Keeney et al. | 285/419 |
| 4,470,622 | 9/1984 | Pate et al. | 285/419 |

FOREIGN PATENT DOCUMENTS

| 0769622 | 10/1967 | Canada | 285/419 |
|---|---|---|---|
| 0827011 | 11/1969 | Canada | 285/DIG. 4 |
| 66062 | 5/1956 | France | 428/179 |

Primary Examiner—Cornelius J. Husar
Assistant Examiner—Eric K. Nicholson
Attorney, Agent, or Firm—Barnes & Thornburg

[57] ABSTRACT

A sheet is disclosed for forming a plurality of coupling bands for connecting the ends of corrugated drain tubes having external grooves. The sheet includes a plurality of parallel lines of hollow lugs. The lugs are separated from each other by an integral web of plastic material. The lugs in each line are spaced sufficiently to allow the resulting coupling bands formed from the sheet to bend freely about the drain tubes to which the couplings are applied. Each line of hollow lugs includes a plurality of spaced-apart columns of hollow lugs aligned in end-to-end relation. Each column includes, in sequence, a first end lug formed to include a flat end wall upstanding in substantially perpendicular relation to the plastic web, a plurality of intermediate lugs of generally frustro-pyramidal shape, and a second end lug formed to include a flat end wall upstanding in substantially perpendicular relation to the plastic web. The aligned columns of each of the parallel lines of hollow lugs are arranged to align said border areas thereby to define a plurality of parallel spaced-apart avenues in the web. The web avenues are aligned in perpendicular relation to the lines of hollow lugs. The sheet is formed with the intermediate transverse cut lines situated in the web avenues so that the sheet can be cut to provide coupling bands of selected lengths to fit tubes of varying diameters.

6 Claims, 7 Drawing Figures

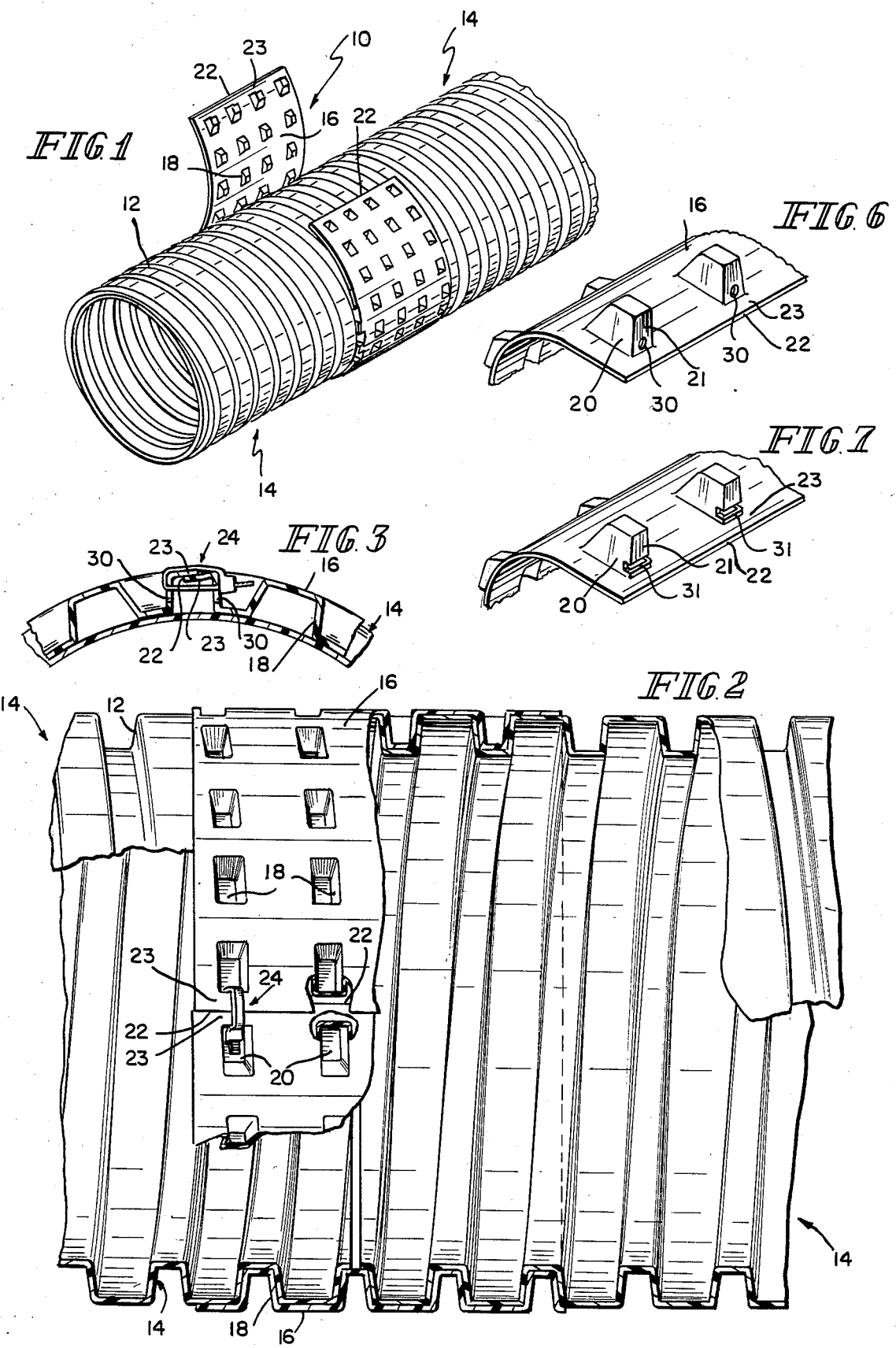

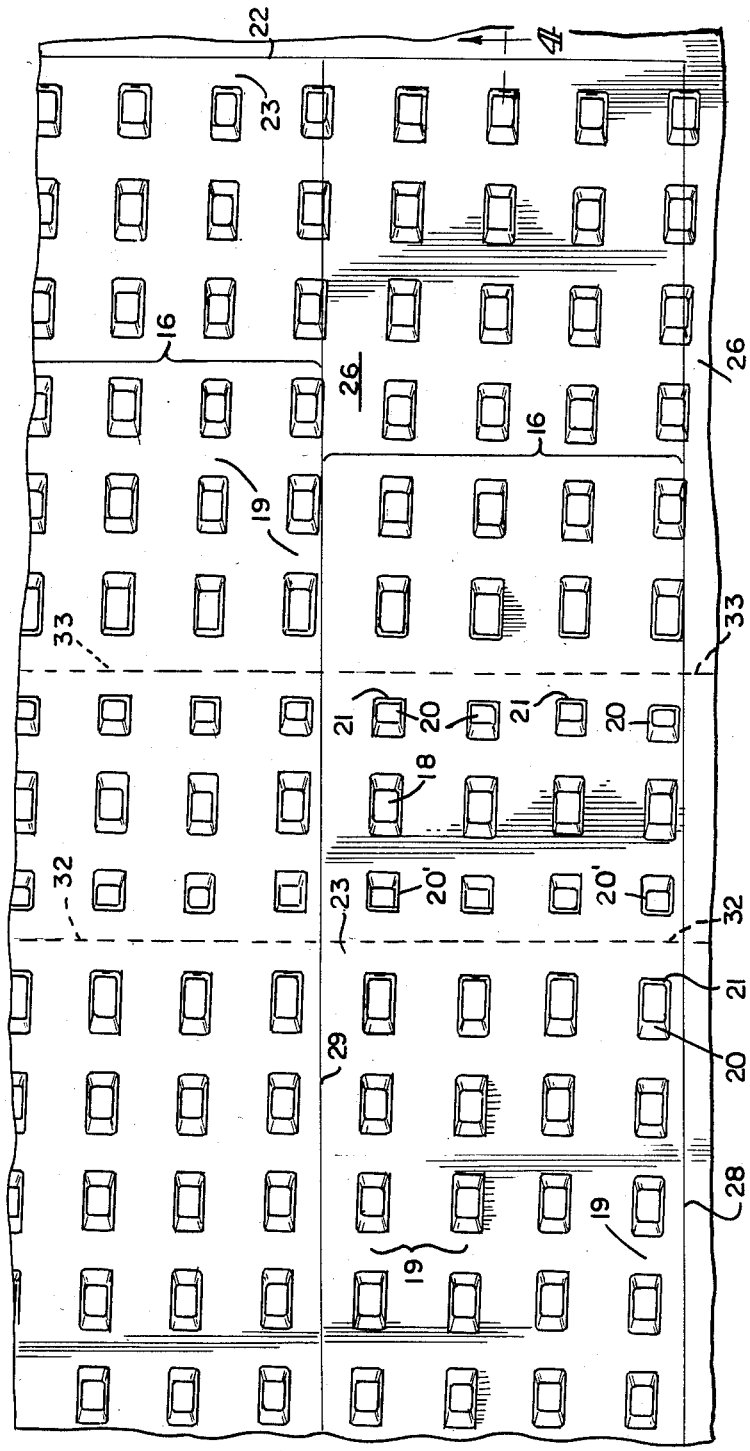
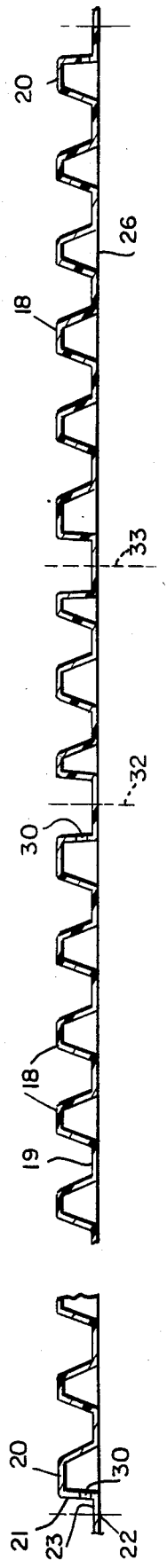
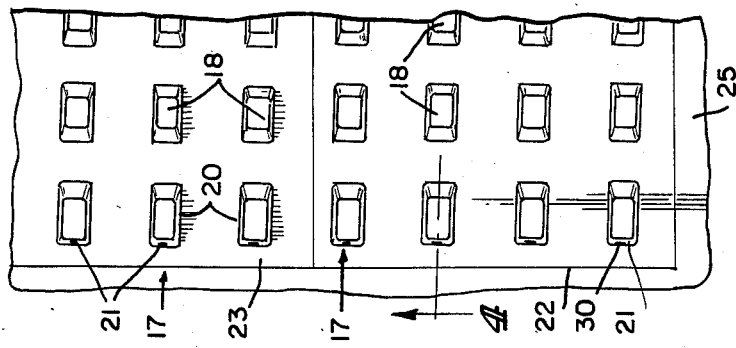
FIG. 4
FIG. 5

CORRUGATED TUBE COUPLING

This invention relates to couplings for connecting corrugated tubes, and in particular, to couplings for helically corrugated plastic drainage tubes.

Modern water drainage systems comprise a network of subsurface plastic tubes, some of which have spaced openings to collect and remove excess ground water, while others may be imperforate to convey the collected water to a point of disposal. Tubes for this purpose are commonly corrugated to provide flexible yet sturdy conduits, and the corrugations may be either circumferential or helical. Typically, the grooves of helically corrugated tubes in standard 15 inch, 18 inch, and 24 inch sizes have a width of about one inch and a pitch of about three inches. Plastic tubes of varying lengths are combined to provide the arterial and branch conduits of a complete drainage network. Corrugated tube is commercially available in long continuous lengths that are generally cut into shorter segments for assembly and subsurface installation. The present invention relates to couplings for joining the open ends of two aligned corrugated tubes and especially for joining helically corrugated tubes.

Various coupling means have been proposed for joining corrugated tubes; however, previously proposed couplings include features which undesirably complicate and increase the cost of their manufacture and application. Some require relatively expensive and complex molding equipment, including separate molds for different sizes. Some include integral studs or pawls or fasteners which require closed matching molds, often with movable cores or side parts. The couplings produced are largely of limited applicability, as because they fit only certain tube sizes, or fail to accommodate tolerance variations in tubes of the same nominal size.

The present invention provides a tube coupling, especially for helically corrugated tubes, which is adapted to be produced from thermoplastic sheet stock by simple thermoforming under pneumatic pressure, as in vacuum forming, with minimal supplemental operations. The coupling thus formed is easily applied, accommodates a workable range of tolerance variations, and is secured in place with simple ties of a readily available type. The couplings may be manufactured to fit a single size of tubes, or may be made to fit large tubes but formed and adapted to be cut at the time of installation to fit smaller tubes. The present invention further provides simple and inexpensive methods for forming such couplings.

In accordance with the present invention, a coupling for connecting the ends of corrugated plastic drain tubes comprises a band of plastic sheet material of a length to wrap circumferentially around the aligned ends of a pair of corrugated plastic drain tubes and of a width to overlie at least one corrugation or groove of each tube. The band includes spaced parallel lines of spaced hollow lugs or the like to engage in the external grooves of the aligned corrugated tubes. The lines of lugs in the band are desirably oriented at an angle corresponding to the pitch angle of the tube corrugations so that the ends of the band will come together in substantial alignment. Thus, for circumferentially corrugated tubes, the lines of lugs run straight with the length of the band, while for helically corrugated tubes the lines are at an angle corresponding to the pitch angle of the helical corrugations. By "pitch angle" is meant the angle between the tangent to the helix and a generator of the cylinder upon which the helix lies. (Dictionary of Scientific and Technical Terms, McGrall-Hill Book Company, 1974).

The pattern of lugs includes rows of transversely spaced end lugs having end walls closely adjacent opposite ends of the band, but spaced from the end edges of the band sufficiently to leave end borders. When the coupling is in place about the aligned tubes, these end walls of the end rows of lugs confront each other in spaced relation, and the end borders abut or overlap to a varying degree. Such end walls contain apertures and the bands are secured in place about the tube ends by connectors extending through the apertures of the confronting lug walls. Preferably, the connectors are self-locking ties such as the molded plastic ties readily available on the market.

The couplings are preferably and conveniently made by thermoforming, for example, vacuum-forming, thermoplastic sheet material to displace the hollow lugs from the sheet material in a desired pattern. Large sheets may be formed with spaced lines of spaced lugs to provide blanks which are then trimmed and slit longitudinally to yield a number of coupling bands. The length of the sheets may be such that when trimmed the bands will be of a length to form couplings for a particular size tube, and the angle of the longitudinal trim and slit cuts may correspond to the pitch angle of that particular tube.

Alternatively, the length of the sheets may be such as to yield bands to form couplings for a large size tube, for example, the standard 24-inch diameter tube, and the pattern of lugs may be such as to provide transverse cut lines, with adjacent end border material and rows of end lugs, so that the large couplings can be cut at such lines to provide couplings for smaller tubes, such as the standard 18-inch and 15-inch diameter tubes. While in this case, a trim and slit angle for the large size tube will not be exactly correct for the smaller tubes, the result will only be that the ends of the shorter couplings will not be exactly aligned when the couplings are applied to the smaller tubes. The misalignment is not substantial and will not affect the coupling function or the convenience of its application.

It has been found convenient and practical to thermoform different lengths of coupling bands on essentially the same molding equipment. A vacuum-forming mold is provided with lug-forming cavities in a pattern which includes rows of end lugs and end borders at both ends, for forming 24-inch couplings. The pattern also provides two intermediate cut lines with rows of end lugs and end border material adjacent each cut line, with the cut lines located to provide coupling bands suitable for 18-inch and 15-inch couplings. Such mold can be used with long sheets to form 24-inch coupling bands or with shorter sheets to form 18-inch and 15-inch couplings. The draw depths of the lugs are relatively deep, and mold-assist elements such as draw plugs for the hollow lugs may be used, in accordance with known thermoforming practice.

Additional features and advantages of the invention will become apparent to those skilled in the art upon consideration of the following detailed description of a preferred embodiment shown in the accompanying drawings and exemplifying the best mode of carrying out the invention as presently perceived. In such drawings:

FIG. 1 is a perspective view of two aligned helically corrugated tubes joined end-to-end by a coupling in accordance with the present invention, the coupling being shown in partially wrapped position;

FIG. 2 is a side elevation of the tubes and coupling of FIG. 1 with portions broken away and shown in section;

FIG. 3 is a transverse section of the coupling showing a self-locking connector extending through confronting lug end walls to secure the coupling band about a pair of aligned tubes;

FIG. 4 is a top plan view of a sheet of thermoplastic material having spaced lines of spaced lugs formed therein, showing trim and slit lines at an angle to the length of the sheet and the lines of lugs;

FIG. 5 is a longitudinal section of the formed sheet, taken on the line 5—5 of FIG. 4; and FIGS. 6 and 7 are perspective views showing alternative forms of end lugs and apertures therein.

As shown in FIG. 1, a coupling 10 is engaged about a pair of coaxially aligned helically corrugated tubes 14 to join the tubes 14 end-to-end. The tubes are formed with an external helical groove 12. The coupling 10 comprises a band 16 including a plurality of spaced lines 17 of generally uniformly spaced intermediate lugs 18 and end lugs 20 to engage in the corrugation grooves 12 of the tubes 14. The end lugs 20 are adjacent the end of the band 16 and spaced from the end edges 22 sufficiently to leave end flanges or borders 23. The end flanges or borders 23 are adapted to overlap when the coupling is in place about the tubes, and are of sufficient width to overlap a variable amount so as to accommodate tolerance variations in the size of the tubes 14. The intermediate lugs 18 are desirably frustums of regular four-sided pyramids, and longitudinally spaced apart by flat sections 19 to provide flexibility of the sheet. The end lugs 20 are similar but shaped with end walls 21 more nearly perpendicular to the sheet so as to stand generally radially of the tubes and in generally parallel spaced relation when the coupling band is wrapped about the tube.

Such end walls are punched or otherwise formed with apertures 30 which come into general alignment when the band is in place. The coupling band is secured about the ends of the tubes 14 by connectors 24 which are passed through the aligned aperture 30 when the band has been wrapped about the tube ends. Desirably, such connectors 24 are molded plastic ties formed at one end with integral self-locking buckles, which are readily available on the market. As shown in FIG. 3, these can be applied with the buckles positioned within one of the hollow end lugs. The extra strap length can then be cut off so that the ties do not protrude to obstruct application of a filter sleeve as in U.S. Pat. No. 4,104,774.

Coupling bands 16 in accordance with the present invention are desirably made by first preparing a blank 26 as shown in FIGS. 4 and 5. An extruded sheet of thermoplastic material is thermoformed, as by vacuum-forming, to form the blank 26 having a series of laterally spaced lines 17 of longitudinally spaced hollow lugs, including intermediate or body lugs 18 and end lugs 20. The intermediate lugs 18 are of generally frusto-pyramidal shape adapted to fit into the grooves 12 of the drain tubes 14 with which the couplings are to be used. The lugs are formed by displacement from the sheet of thermoplastic material in a conventional thermoforming procedure such as vacuum forming. The lugs desirably involve a relatively deep draw, and the thermoforming may be assisted by the use of conventional plug-assist elements to move material into the mold cavities before applying the vacuum to form such material to its desired shape. The lugs in each line are spaced sufficiently to allow the resulting coupling bands to bend freely about the drain tubes to which the couplings are applied.

A transverse row of end lugs 20 are formed adjacent each end of the blank in spaced relation from the end trim line 22 at which the blank will be trimmed to form its end edges 22, so as to leave an end flange or border 23 between such row of end lugs 20 and such end edge 22. The end walls 21 of the end lugs 20 stand at a greater angle than the side walls of the intermediate lugs 18, desirably close to a 90° angle to the web of the blank 26, so that when the coupling bands are applied to the drainage tubes, such walls will stand in a generally parallel confronting relation, as shown in FIG. 3.

When the blank 26 has been formed with the lugs, it is removed from the mold and trimmed at the end trim lines 22, parallel to the end rows of end lugs 20 and spaced therefrom to provide end borders 23 of predetermined width. The blank is then also trimmed at its edges along side trim lines 28 and slit on slit lines 29 to form a plurality of coupling bands 16. These side trim lines 28 and the slit lines 29 are parallel, so as to form bands of uniform width. For helically corrugated tubes, such lines are desirably at a small angle to the lines 17 of lugs, corresponding to the pitch angle of the tubes on which the coupling bands are to be used.

Preferably, large-size coupling bands are also formed with intermediate transverse cut lines 32 at which the large coupling band can be cut to provide coupling bands to fit smaller tubes. Thus as shown in FIGS. 4 and 5, the blank 26 is shown with a transverse cut line 32 at which long bands can be cut in the field to a 59-inch length to fit 15-inch drainage tube, and a transverse cut line 33 at which cuts can be made to provide bands of 68-inch length to fit 18-inch drainage tubes. At each cut line 32 and 33, the blank is formed with flange or border portions 23 adjacent the cut line, and the adjacent row of lugs to the left of the cut line are formed as end lugs 20 with more nearly perpendicular end walls 21 so that when the shorter bands are used on smaller pipes, such end walls 21 will come together in confronting, substantially parallel spaced relation as shown in FIG. 3. As shown, the lugs 20' to the right of the cut lines are also formed as end lugs and spaced from the cut lines so that the shorter pieces cut off in the field can also be used on smaller tubes. Thus two such pieces cut off full 88-inch length bands to form 59-inch bands for 15-inch tubes will have lengths of 29 inches and can be combined to form another band for a 15-inch tube.

When blanks 26 are formed to provide large-size coupling bands and to be cut to provide shorter coupling bands for smaller tubes, the angle at which the side trim lines 28 and slit lines 29 are cut may be selected to correspond to the pitch angle of an intermediate-size drainage tube. Thus as shown in FIG. 4, the trim line 28 and parallel slit line 29 are at an angle of approximately 1° 57' corresponding to the pitch angle of standard 18-inch drainage tubes. While this will result in some deviation from alignment when full-length bands from the same blank are applied to 24-inch tubes and shorter bands are applied to 15-inch tubes, the misalignment of the band ends is not substantial and does not interfere with the function of the coupling. Instead of forming shorter-length bands by providing cut lines in longer-length bands, blanks 26 can be made of a length to provide bands 16 to fit specific sizes of tubes. In that case, the bias angle of the side trim lines 28 and slit lines 29 can be made to correspond closely to the helix angle of the particular tube on which the bands are to be used. In such case, also, the pattern of lugs may be originally molded on lines at an angle to the longitudinal dimension of the blank, rather than being molded on lines parallel to such dimensions as contemplated in FIG. 4. These same procedures can be used to produce coupling bands for circumferentially corrugated tubes, in which case the blank is trimmed on lines parallel to the lines of lugs rather than at a bias angle thereto.

The apertures 30 in the end walls 21 of the end lugs 20 can be formed in various ways. As shown in FIG. 6, the end walls 21 of end lugs 20 are punched or drilled to form round apertures 30. This procedure requires that the apertures be formed as supplemental steps, after the blank has been trimmed to its final length. Alternatively, elongated apertures 31 as shown in FIG. 7 may be formed by saw cuts through the end walls 22 along each row of end walls 20 of a blank 26, and such cuts can be made either before or after the blank 26 has been trimmed or slit or cut to length. For example, a small circular saw can be passed along the cut line 32 of the blank shown in FIG. 4 to cut elongated apertures in the form of saw kerfs 31 in the end walls 21 of the end lugs 20 adjacent that cut line.

The present invention provides drain tube couplings of inexpensive construction adapted to securely connect the aligned ends of two corrugated drain tubes and to accommodate tolerance variations in the sizes of such tubes. The coupling bands can be formed by simple thermoforming processes, such as vacuum-forming, and are not molded with integral connectors which require manufacture in matched molds. The lugs of the coupling band are so formed and arranged that they provide confronting parallel spaced walls at the adjoining ends of the wrapped band, which walls can be easily provided with aligned apertures for the reception of separate connectors such as commercially available self-locking ties. These can be pulled tight to draw the coupling band close about the tube ends with the band ends overlapping to whatever extent is required to closely fit the aligned tubes and form a secure joint between them.

The invention has been described in detail with reference to a preferred embodiment exemplifying the best mode of carrying out the invention as presently perceived, but it will be understood that variations and modifications of such embodiment may be made within the scope of the invention as defined in the following claims.

What is claimed is:

1. A sheet for forming a plurality of coupling bands for connecting the ends of corrugated drain tubes having external grooves, the sheet comprising a plurality of parallel lines of hollow lugs, the lugs being separated from each other by an integral web of plastic material, each line of hollow lugs including a plurality of spaced-apart columns of hollow lugs, each column having in sequence a first end lug formed to include a flat end wall upstanding in substantially perpendicular relation to the plastic web, a plurality of intermediate lugs, and a second end lug formed to include a flat end wall upstanding in substantially perpendicular relation to the plastic web, adjacent spaced-apart columns in each line being arranged end to end to position the flat end walls of the first end lug of one of the adjacent spaced-apart columns and the second end lug of another of the adjacent spaced-apart columns in confronting relation separated by a border area, the columns of each of the parallel lines of hollow lugs being arranged to align said border areas thereby to define a plurality of parallel spaced-apart avenues in the web, the web avenues being aligned in perpendicular relation to the lines of hollow lugs, wherein each coupling band formed in the sheet is defined by at least one transverse cut line situated in one of the web avenues and a pair of laterally spaced-apart slit lines substantially normal to the at least one transverse cut line, the hollow lugs being spaced sufficiently along each of the parallel lines of lugs to permit the coupling band when severed from the sheet to be wrapped around the ends of the corrugated drain tubes and the parallel lines of lugs being spaced apart so that the lugs thereof engage in the external grooves of the two corrugated drain tubes to permit the ends of the tubes to be interconnected by a coupling band of the sheet, and wherein the flat end walls of selected first and second end lugs have apertures formed therein for the reception of coupling band connectors so that such end walls are joinable with coupling band connectors to hold a band severed from the sheet in coupling relation with the tubes.

2. The sheet of claim 1, wherein said parallel lines of lugs are disposed at an angle to the length of each coupling band formed in the sheet and the angled lines of lugs engage in external helical grooves of the tubes to cause the coupling band ends to come together in substantial alignment when the coupling band is severed from the sheet and wrapped circumferentially around the aligned ends of the tubes.

3. The sheet of claim 1, wherein the sheet is a thermoplastic material and the lugs are formed therein by thermoforming under heat and fluid pressure.

4. The sheet of claim 1, wherein the lugs are formed by vacuum-forming the sheet.

5. The sheet of claim 1, wherein said end lug end walls contain punched or drilled apertures.

6. The sheet of claim 1, wherein said end lug end walls contain apertures in the form of transversely extending kerfs.

* * * * *